United States Patent [19]
Kweon et al.

[11] Patent Number: 6,057,943
[45] Date of Patent: May 2, 2000

[54] G3 FACSIMILE TRANSMISSION METHOD ON CDMA CELLULAR NETWORKS

[75] Inventors: Hye Yeon Kweon; Sang Sik Lim; Sook Hyun Jang, all of Daejeon, Rep. of Korea

[73] Assignee: Electronics and Telecommunications Research Institute, Daejeon, Rep. of Korea

[21] Appl. No.: 09/097,483

[22] Filed: Jun. 15, 1998

[30] Foreign Application Priority Data

Jun. 16, 1997 [KR] Rep. of Korea ............... 97-24954

[51] Int. Cl.[7] .................................................. H04N 1/00
[52] U.S. Cl. .................... 358/435; 455/426; 455/557; 370/466; 370/469
[58] Field of Search ................................. 358/400, 434, 358/468, 435; 370/464, 466, 469, 335, 342, 347, 479; 455/426, 517, 557, 575; 375/222

[56] References Cited

U.S. PATENT DOCUMENTS

| | | | |
|---|---|---|---|
| 5,481,561 | 1/1996 | Fang | 375/205 |
| 5,491,565 | 2/1996 | Naper | 358/468 |
| 5,574,773 | 11/1996 | Grob et al. | 455/466 |
| 5,845,215 | 12/1998 | Henry et al. | 455/553 |
| 5,850,391 | 12/1998 | Essigmann | 370/331 |
| 5,873,035 | 2/1999 | Ladden et al. | 455/436 |
| 5,936,948 | 8/1999 | Sicher | 370/314 |
| 5,956,651 | 9/1999 | Willkie et al. | 455/553 |
| 5,963,860 | 10/1999 | Muths et al. | 455/412 |

*Primary Examiner*—Kimberly A. Williams
*Attorney, Agent, or Firm*—Cohen, Pontani, Lieberman & Pavne

[57] ABSTRACT

A facsimile transmission method on the CDMA cellular networks is disclosed and includes the following steps. A data terminal having upper layer protocols of a PPP and above recognizes and stores a modem command until a facsimile modem in a base station is acquired, and requests the fax call caused by a modem dial command with dial number to the mobile terminal through a serial interface. The mobile terminal establishes a fax call with a base station based on the same call processing as that of a voice, and acquires the facsimile modem in a base station. After the call establishment between the mobile terminal and the base station, the upper layer protocols in the data terminal are initialized and negotiated with counterpart protocols in the said base station. The data terminal transmits the fax image data encapsulated by the upper layer protocols to the mobile terminal and the mobile terminal transmits it encapsulated and segmented by the lower layer protocols to the base station. The base station recognizes the encapsulated and segmented image data, processed it to remove the protocols and converts the raw data to transmit to the counterpart fax terminal in an identical CDMA network or a different network such as PSTN. Thereafter, the facsimile application software in the data terminal and the counterpart fax terminal progress the facsimile service following the standard phases of the ITU-T recommendation T.30.

4 Claims, 7 Drawing Sheets

G3 FACSIMILE TRANSMISSION METHOD ON CDMA CELLULAR NETWORKS

BACKGROUND OF THE INVENTION

1. Field of the Invention

The present invention relates to a facsimile (hereinafter called fax) transmission method on Code Division Multiple Access (hereinafter called CDMA) cellular networks. Particularly, It provides a reliable fax service on CDMA mobile communication system using a general computer networking environment being able to access the Internet.

2. Description of the Conventional Art

Group III (hereinafter called G3) fax is one of the fax standards recommended by the ITU-T(previously CCITT), by which it processes an image signal digitally and has a large amount of information because it increases the number of pixels for obtaining the same good resolution as that of an analog signal.

The said G3 fax service is implemented based on the ITU-T recommendation T.30 for a general switched telephone network including a fax calling identification, a parameter negotiation, a page transmission, a receiving identification, and a calling release, etc, and the ITU-T recommendation T.4 protocol for a fax machine for encoding an image signal of a document.

FIG. 1 is a brief block diagram illustrating a group III fax service system for a conventional public switched telephone network (hereinafter called PSTN), which has a transmission unit 100 for a calling part, the PSTN 200 for transmitting a fax signal and a reception unit 300 for a called part. The transmission unit 100 includes a CCD scanner 110 for reading an image data to an analog signal, an analog/digital (A/D) converter 120 for converting the analog signal from the CCD scanner 100 into a digital signal, MH/MM/MMR compression unit 130 for compressing the converted digital signal following the T.4 protocol, and a fax modem 140 for converting the compressed digital signal into the analog signal for transmitting through the PSTN 200. The reception unit 300 includes an fax modem 310 for converting the analog signal receiving from the PSTN 200 into digital signal for signal processing, MH/MR/MMR expansion 320 for decompressing the signal following the T.4 protocol and a thermal printer 330 for printing the image signal.

The fax service on PSTN 200 is implemented on a fax apparatus with the transmission unit lOC and the reception unit 300 or a personal computer with fax application software and the fax modems 140 and 310. The fax apparatus or the personal computer can be called as a fax terminal.

The modems 140 and 310 follow the transmission procedure of the T.30 and they are used for the end-to-end data conversion.

However, in CDMA cellular networks, a data conversion is required only when a CDMA cellular network is interworked with a non-CDMA cellular network such as a PSTN or an analog cellular network because the digital image data or a fax terminal can be delivered digitally between the fax terminal and the network.

Therefore, there is an interworking function (hereinafter called IWF) in a fixed station such as a base station or a mobile switching unit for the said data conversion in the CDMA cellular network. The IWF has fax modem pools and protocol conversion functions and speed matching functions between sub-systems of the networks.

Since the T.30 and the T.4 protocol for GIII fax service were proposed for error-free wired network such as general switched telephone network, the using of the protocols in the CDMA cellular network which has high Error and call drop by signal noise, fading and frequent handover, may cause a degradation of the service.

So the CDMA cellular networks have a protocol stack for compensating the service degradation on the unreliable CDMA radio channel. The protocol stack is shown in FIG. 2 and it is recommended as a standard in IS-99 which is an EIA/TIA standard for asynchronous data and fac service for wideband spread spectrum.

The asynchronous data 401 and thee fax 402 represent an application software for an asynchronous data and a fax service, the application interface 403 processes the standard/expanding AT modem commands and negotiates a data compression.

This protocol stack is based on the transport control protocol 404/internet protocol 406(hereinafter called TCP/IP) which is popularly used for the Internet service. The internet control message protocol (hereinafter called ICMP) 405 handles a control message for IP. The internet protocol control protocol (hereinafter called IPCP) 408, the Link control protocol (hereinafter called LCP) 409, and the point-to-point protocol (hereinafter called PPP) 410 are used for transmitting the TCP/IP packet through the low rate serial link. The sub-network dependent convergence function (hereinafter called SNDCF) 407 is used for a TCP/IP header compression. Hereinafter, the said application software 401/402, the said application interface 403, the TCP/IP 404/406, the ICMP 405, the IPCP 408, the LCP 409, the PPP 410 and the SNDCF 407 are used as upper layer protocols.

In addition, the radio link protocol (hereinafter called RLP) 411 is used for a link layer protocol for providing an octet stream transport service over radio channel. The RLP layer segments a variable length data packet of an upper layer into a CDMA traffic channel frame. It operates on a featureless octet stream and delivers the octet in the order received from the upper layer because there is no direct relationship between the upper layer packet and CDMA traffic channel frames.

FIG. 3 shows the example of a fax transmitting/receiving procedure on a conventional PSTN for illustrating the ordinary fax service procedure in the conventional art and comparing with one of the CDMA cellular network.

The calling part 510 and called part 520 of FIG. 3 are configured with a data terminal equipment (hereinafter DTE) 510a/520b and a data circuit equipment (hereinafter called DCE) 510b/520a and use a G3 fax class II modem command.

Though the modem command for controlling the fax modem can differ with each modem manufacturer, the operating methods thereof is implemented base on the ITU-T recommendation T.30 procedure. Since all fax terminal do not follow the T.30 fully, the procedure showing FIG. 3 may also have some difference with the standards.

The said ITI-T recommendation T.30 has five separate and consecutive phases A, B, C, D and E. A phase A establishes the fax call, a phase B is a pre-message procedure for identifying and selecting the required facilities, a phase C is a message transmission procedure, a phase D is a post-message procedure including an end-of-message and a confirmation and multi-document procedures, and a step E releases the call.

These phases represent the call establishment and release based on the common rules used on general switched telephone network and the fax transmission identification, inspection and control.

Following the FIG. 3, when the DTE 510a of the calling part initiates a call using an modem dial command (ATD) with dial number, the DEC 510b of the calling part sends a dial tone to the DCE 520a of the called part and detects the call progress in phase A. Thereafter it generates a CIIG tone and waits for a DIS tone from the DCE 520a of the called part.

When the DCE 510b detects the V.21 Ch.2 modulated by 300 bits/s HDLC flags, it sends a confirmation response message (+FCON) informing the DTE 510a of the normal connection with the called part.

In the phase B, the DCE 510b of the calling part and DCE 520a of the called part identify their capabilities such as a vertical resolution and bit rate, etc, and their appropriate receiving condition, etc, with a received function identification tone (DIS). Then the DCE 510b of the calling part generates a receiving command tone(DCS) continuously based on the DIS tone and current session parameter (+FDIS) fixed before. When the DTE 510a of the calling part sends the data transmission acknowledgement message (+FDT), the DCE 510b of the calling part stops the DCS tone and the phase C is going on.

Entering the phase C, both part transmit and receive the actual image data and control character <DLE><ETX>.

When the one page document is transmitted, the post-message procedure including end-of-message and multi-document procedure in the phase D is progressed. In the phase D, if DCE 510b receives the previous page result response (+FET) with value 0 which means the next page documents is remain from DTE 510a, the phase B, C, and D are repeated until a previous page result response (+FET) will be value 2 which means the end of page.

Then, in the phase E, the call is released and the DCE 510b of the calling part and DCE 520a of the called part transmit the modem hangup code (+FHND) with hangup code to each DTE 510a of the calling part and DTE 520b of the called part.

In order to implement the fax services on the CDMA cellular networks, the combination and synchronization of the serial call processing procedure between the mobile station and the base station should be combined with the fax transmission procedure of PSTN based on the ITU-T recommendation T.30 shown in the FIG. 3 and the procedures should be synchronized.

SUMMARY OF THE INVENTION

Accordingly, the present invention to provide a fax transmission method on CDMA cellular networks has one object to resolve the aforementioned problems encountered in the conventional art and the other one to use a common networking environment being able to access the Internet with the notebook computer for usefulness and convenience of the user.

To achieve the above object, our present invention has a fax service system in CDMA cellular networks which includes a mobile terminal providing a radio link, a data terminal with a fax application software, and a base station with interworking function(IWF). The said fax service system communicates with the counterpart fax terminal in the PSTN or an identical CDTIA cellular network, etc via IWF. The mobile terminal and the data terminal are interconnected with serial interface.

The data terminal has upper layer protocols of the said PPP and above and the mobile terminal has the lower layer protocol of the said RLP and below. The protocols in the data terminal can be achieved easily by using conventional computer networking environment accessing the internet and only the application software operating on the said protocols is needed.

The application software in the data terminal uses a general modem command for controlling the fax modem in IWF. The modem commands are recognized in the application interface in the data terminal. The application interface processes and stores the modem commands which are a modem configuration parameter and a modem control command until being able to charge the modem in IWF.

When the application interface receives a modem dial command (ATD) with dial number from application program, it sends a fax call origination signal to the mobile terminal. The mobile terminal sends the origination message to the base station for initiating a call. The series of a call procedure thereafter is the same call processing as that of a voice.

When the mobile terminal receives the service option response order informing the acquisition of a modem in IWF from the base station, it activates the RLP and sends the connection confirm signal to the application interface in the data terminal. From receiving the connection confirm signal, the PPP, the LCP, the IPCP and the TCP/IP in the data terminal are initialized and negotiated with counterpart protocols in the base station. Then the application interface in the data terminal sends the stored modem commands including modem dial command (ATD) with dial number encapsulated in the protocols to the acquired modem in IWF.

After the application interface receives the confirmation response message(+FCON) informing the connection with the counterpart modem from the modem in IWF, the normal fax procedure, phase B, is started between the modem in IWF and the counterpart modem. Thereafter, the fax service is the same as of the PSTN showing FIG. 3.

DETAILED DESCRIPTION OF THE INVENTION

Figure 4:
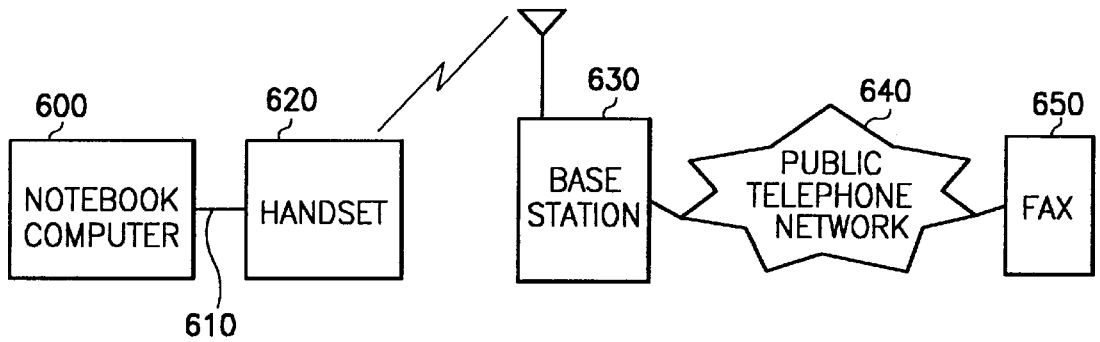
FIG. 4 shows a schematic diagram for a CDMA fax service system embodying the principles of the invention.

A schematic diagram for a CDMA fax service system is shown in FIG. 4. A notebook computer 600 is a data terminal and a cellular phone 620 is a mobile terminal. The notebook computer 600 and the cellular phone 620 is connected with a serial communication interface 610. A notebook computer 600 has the application software for fax service and the cellular phone provides the radio link for fax transmission. The base station 630 includes the normal base station and mobile switching center with interworking function (hereinafter called IWF). The IWF is a fax modem pool for data conversion and has a protocol stack for compensating the radio error. The base station 620 communicates with the fax machine by interworking with the PSTN.

With the configuration of the FIG. 4, the fax service system on CDMA cellular network communicates with the counterpart fax terminal in PSTN or an identical CDMA cellular network, etc. via IWF.

Figure 1:
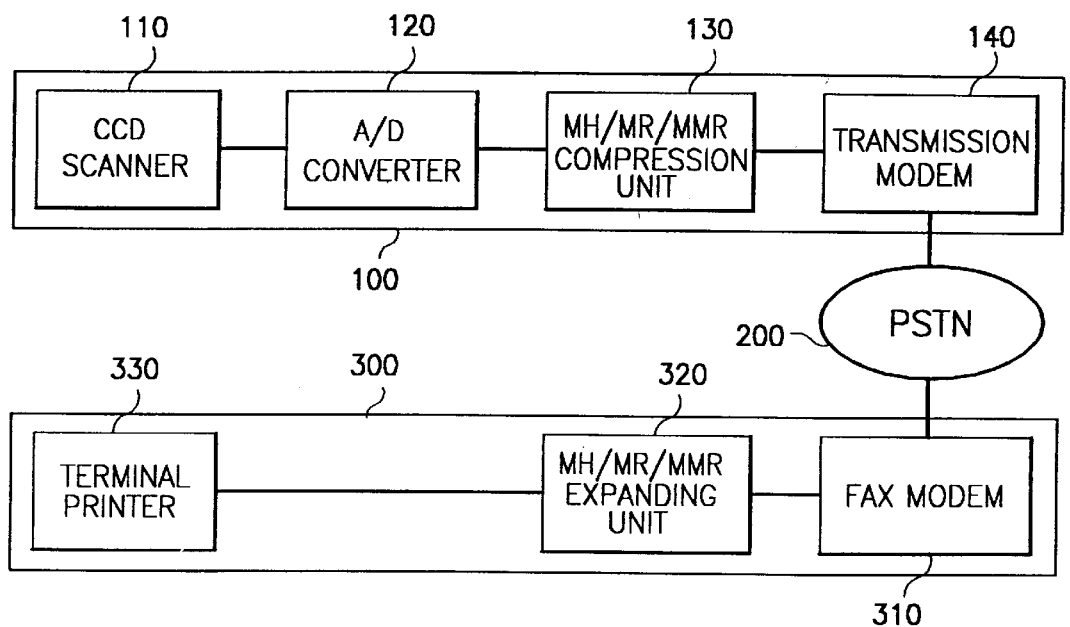
FIG. 1 shows a block diagram of c conventional group III fax system for illustrating the operation of the general fax service.
Figure 2:
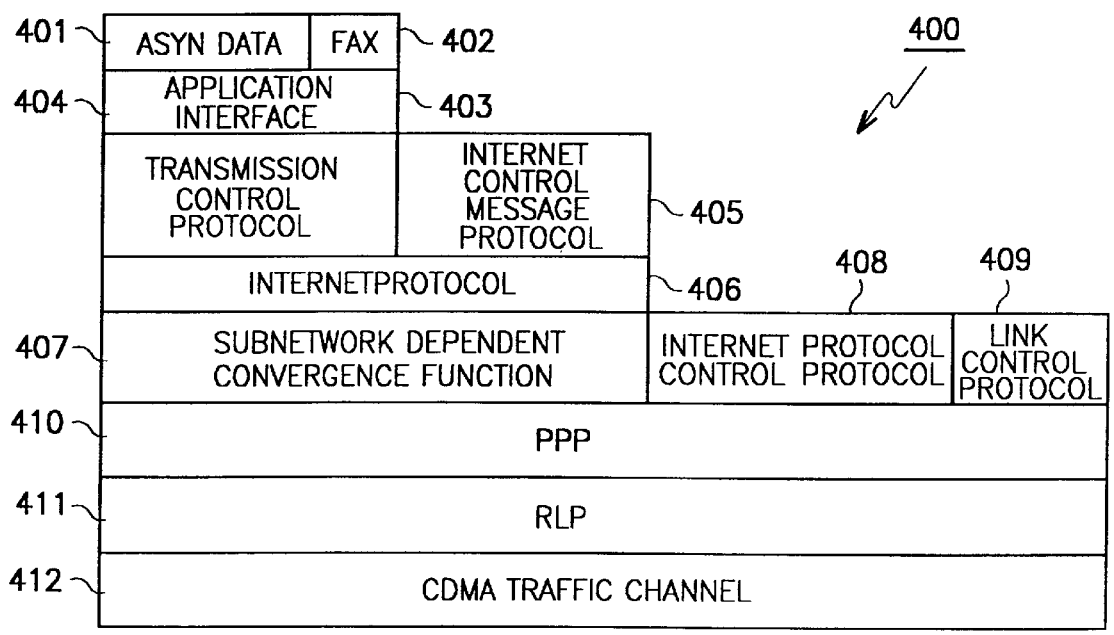
FIG. 2 shows a standard protocol stack for wideband spread spectrum embodying the principles of the invention.
Figure 3:
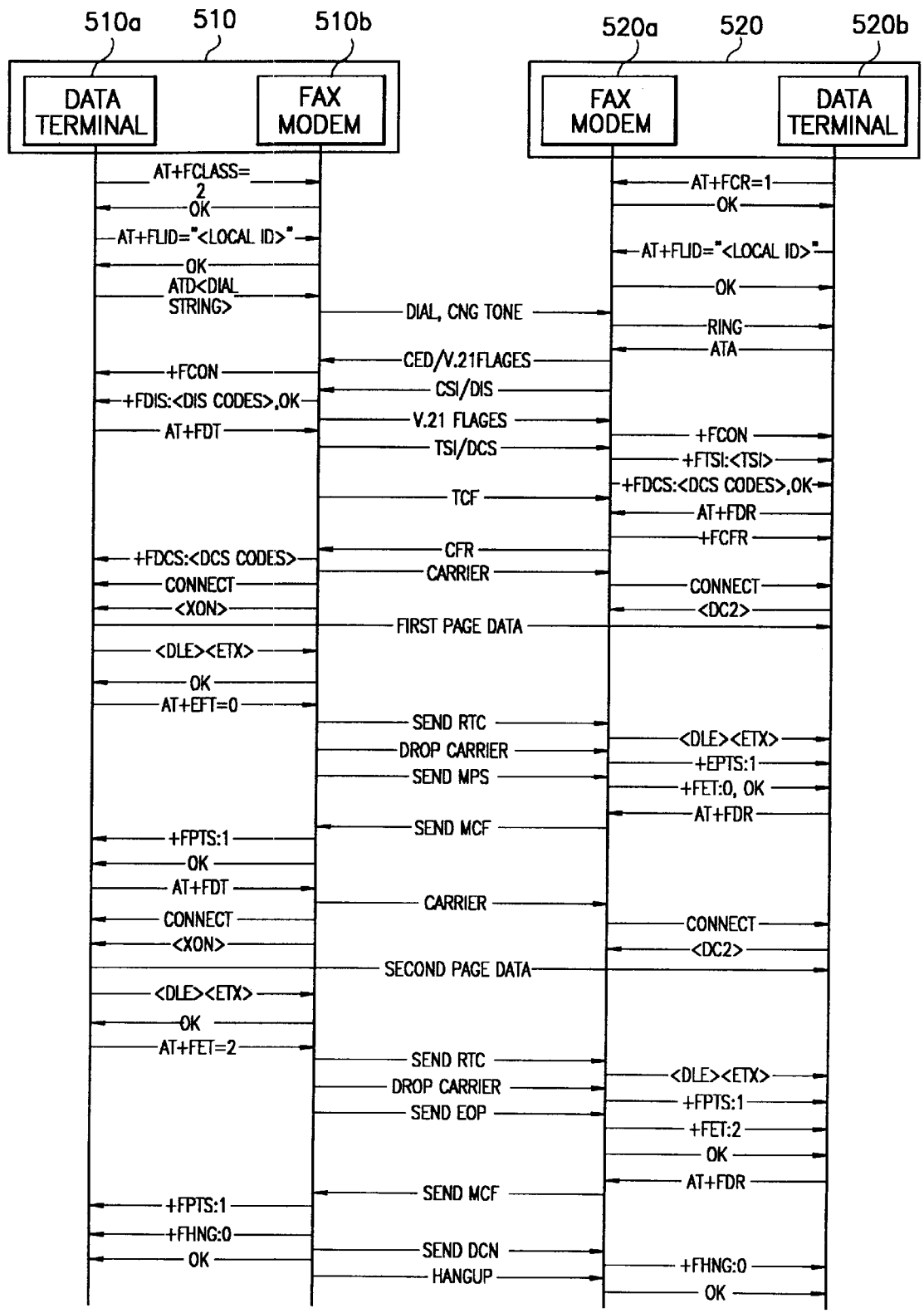
FIG. 3 shows an example of the fax transmission procedure for illustrating the ordinary scheme on general switched telephone network.
Figure 5:
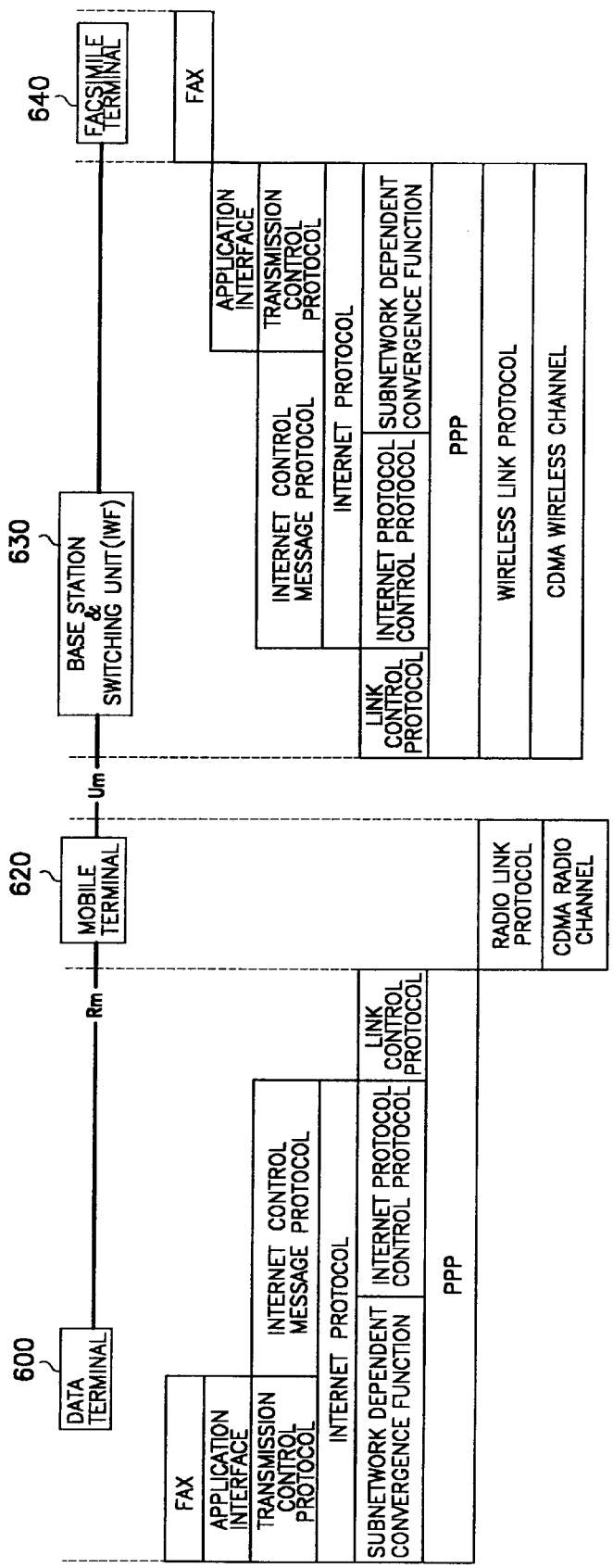
FIG. 5 shows the arrangement of the protocol stack in data terminal, mobile terminal and base station embodying the principles of the invention.

In the implementation of the said protocol stack shown FIG. 2, the upper layer protocols of the PPP and above are the same as of the internet access environment with general dial-up modem called PPP dial-up service. Therefore, the direct application of the PPP dial-up service to the CDMA cellular networks is expected good choice for a user who has own computer network environment. FIG. 5 shows that the said protocol stack shown in FIG. 2 is appropriately arranged in a data terminal TE2 600, a mobile terminal MT2 610, and a base station BS 630.

The data terminal has the upper layer protocols including the application software, the application interface, the TCP, the IP, the IPCP, the LCP and the PPP. The mobile terminal has the lower layer protocol including the RLP and the CDMA traffic channel. The protocols in the data terminal can be achieved easily by using conventional computer networking environment accessing the internet and only the application software operating the protocols is needed. The Protocol stack in BS 630 may be distributed several place or integrated one or two place.

Figure 6:
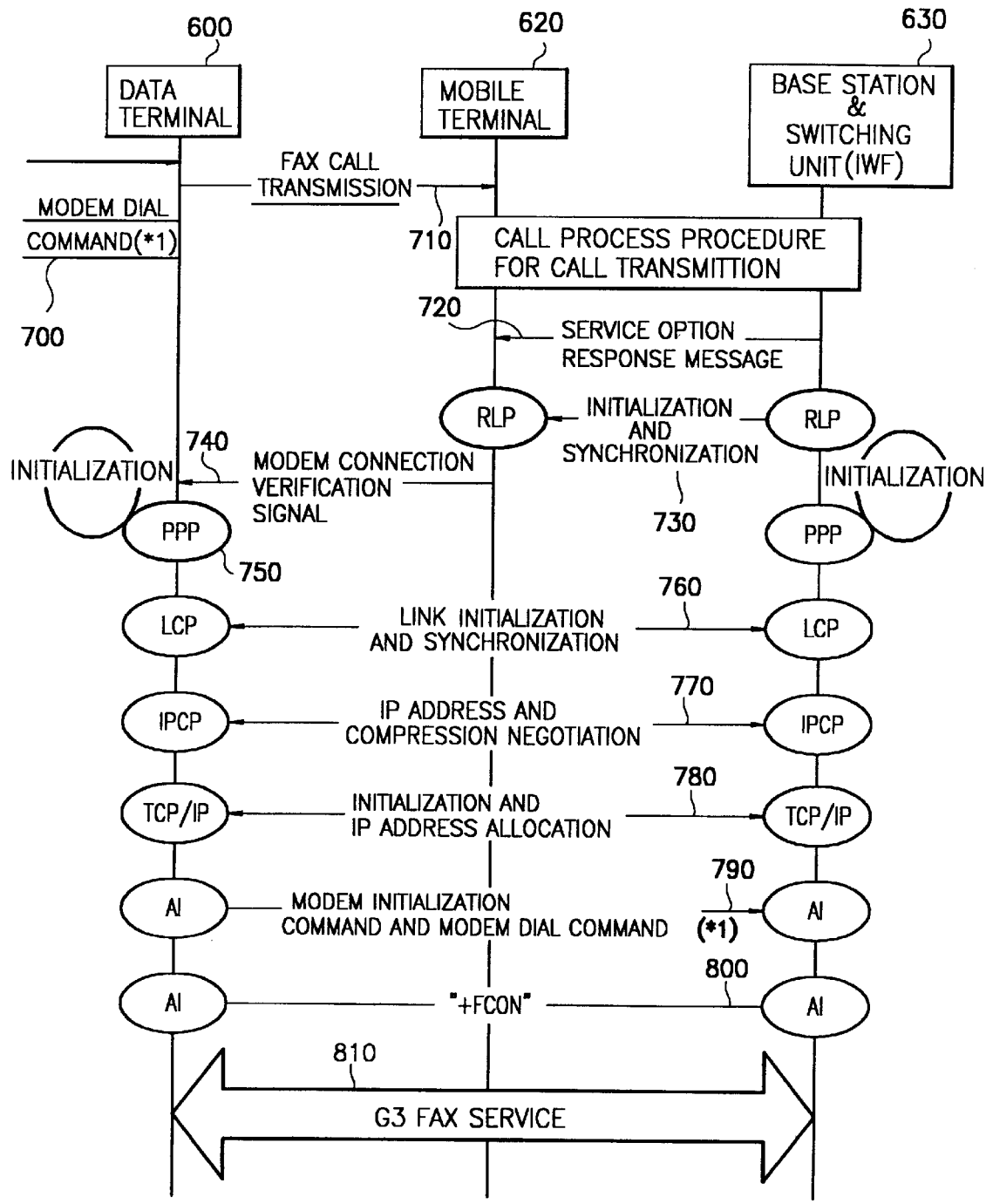
FIGS. 6 and 7 show the procedure of the fax service embodying the principles of the invention.
Figure 7:
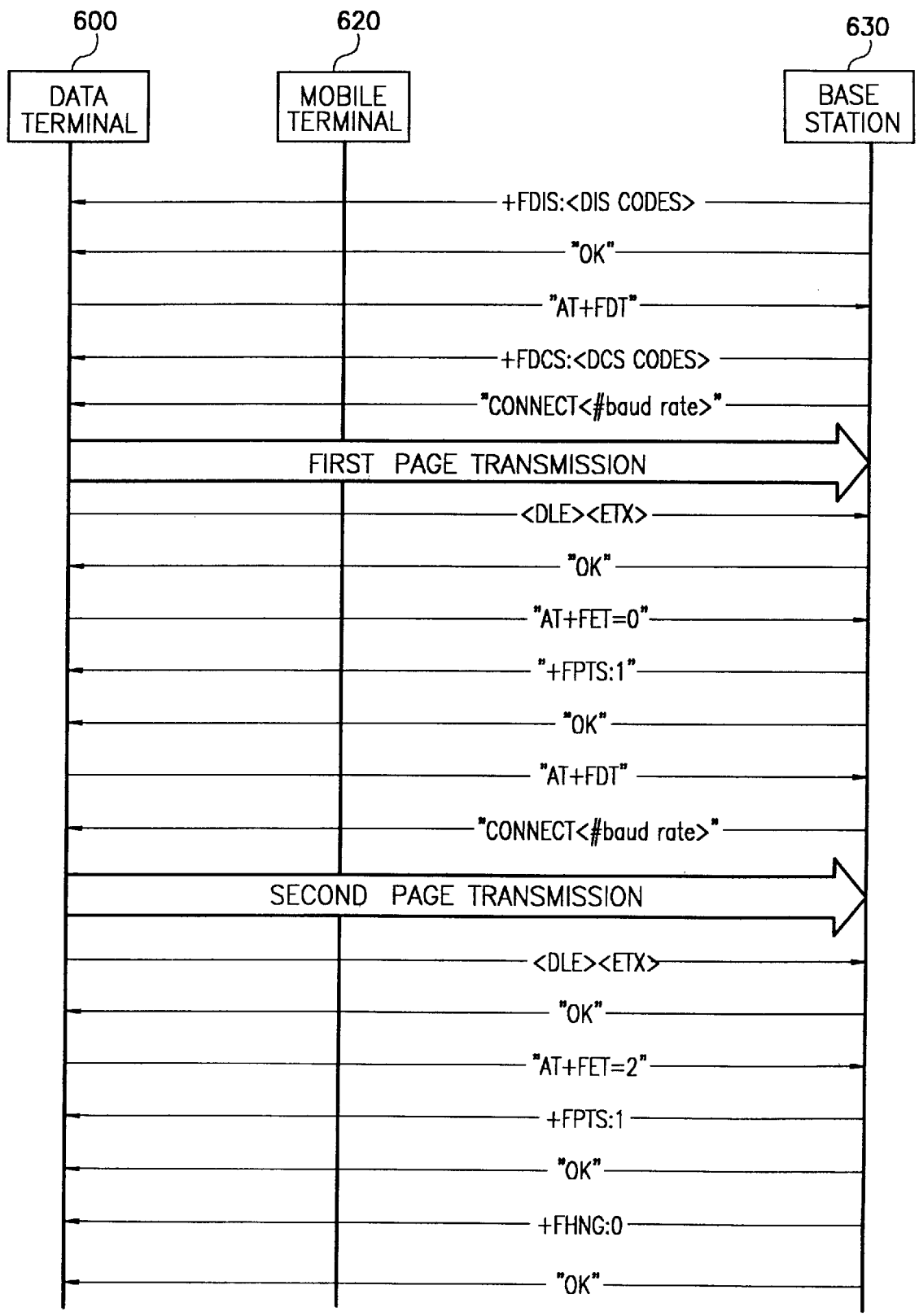

FIGS. 6 and 7 show the call procedure of the fax service. FIG. 6 shows mainly the call establishment procedure following CDMA standard call processing and the protocols operation between the mobile station including the data terminal and the mobile terminal and the base station, and FIG. 7 shows mainly the modem operation following T.30 between the data terminal and the modem in the IWF.

The application software in the data terminal uses a general modem command for controlling the fax modem in IWF. The modem commands is recognized in the application interface in the data terminal. The application interface processes and stores the modem command which is the modem configuration parameter and the modem control command until being able to charge the modem in IWF.

The call initiation is started with a modem dial command (ATD) with called user dial number 700 by user key input of the application software on data terminal TE2 600.

When the application interface receives a modem dial command (ATD) with dial number from application software, it sends a fax call origination 710 signal to the mobile terminal MT2 620.

The mobile terminal sends the origination message to the base station for initiating a call. The series of a call procedure thereafter is the same call processing for origination call as that of a voice.

When the traffic channel is allocated from the base station BS 630 and the mobile terminal receives the service option response order informing acquisition of a modem in IWF and confirmation of the fax call 720 from the base station, it activates the RLP 730 and sends the connection confirm signal 740 to the application interface in the data terminal.

From receiving the connection confirm signal, the PPP 750, the LCP 760, the IPCP 770 and TCP/IP 780 in the data terminal are initialized and negotiated with counterpart protocols in the base station according to the low order. Then the application interface in the data terminal sends the stored modem commands including modem dial command (ATD) with dial number (*1) 790 encapsulated in the protocols to the acquired modem in IWF. After the application interface receives the confirmation response message(+FCON)800 informing the connection with the counterpart modem from the modem in IWF, in the T.30 procedure, the phase A is done and phase B is started between the modem in IWF and the counterpart modem 810. The procedure after phase B is shown in FIG. 7.

The AT command and +F precedence command shown in FIG. 7 are common normal and expanding modem commands which is an ordinary modem standard command and are shown in T.30 procedure.

When once the traffic channel is opened between the mobile station and the base station, the fax software on the TE2 600 transmits the documents of a page unit following the T.30 procedure with controlling the acquired modem in IWF.

First, the TE2 600 receives a current session parameter (+FDIS) with dcs code and OK character from the BS 630 and transmits the data transmission acknowledgement message (+FDT) to the BS 630. Then the TE2 600 receives a receiving capability parameter (+FDCS) with dcs code. When the call connection with the counterpart modem is confirmed, the modem in IWF 620 sends the CONNECT message with baud rate to the TE2 600 and the transmission of a first page documents is achieved.

When the transmission of the one page documents is finished, the TE2 sends the control character which means the end-of-message and the modem in IWF 630 acknowledges with OK character.

To multi-document transmission is requested, the TE2 sends a previous page result response (+FET) with value 0 informing the transmission of the next page documents.

At this time, the modem in IWF 630 acknowledges with a page transmission condition (+FPTS) with value 1 informing the success of receipt and OK character. Hereafter, the phase B, C and D are repeated from transmitting the data transmission acknowledgement message (+FDT) to the BS 630 until all page transmission are finished and the TE2 600 sends a previous page result response (+FET) with value 2 informing all page are transmitted. Then, the modem in IWF 630 acknowledges with a page transmission condition (+FPTS) with value 1 informing the success of receipt and OK character.

In the phase E, the modem in ITF 630 sends the modem hangup command +FHNG with value 0 informing normal release and OK character. The protocols in the TE2 600, MT2 620 and BS 630 are deactivated and released following the opposite sequence of the call setting procedure.

What is claimed:

1. A method for transmitting a facsimile between a code division multiple access (CDMA) cellular network having a mobile station and a base station having one of a CDMA cellular network and a different network, said method comprising the steps of:

a. recognizing a modem command or modem configuration and call establishment using a data terminal in the mobile station comprising upper layer protocols including an application software, an application interface, a transport control protocol, an internet control message protocol, an internet protocol, and a point-to-point protocol, storing the modem command until a modem is acquired using the data terminal, and requesting a facsimile call using the data terminal with a modem dial command to a mobile terminal in the mobile station having a facsimile modem and lower layer protocols including a radio link protocol and a CDMA traffic channel;

b. setting up a call connection between the base station and the mobile terminal following call processing and acquiring the facsimile modem from the base station;

c. transmitting a facsimile image data encapsulated by the upper layer protocols from the data terminal to the mobile terminal;

d. encapsulating and segmenting the facsimile image data using the lower layer protocols and transmitting the encapsulated and segmented facsimile image data from the mobile terminal to the base station; and e. recognizing the encapsulated and segmented facsimile image data at the base station, removing the upper and lower layer protocols from the encapsulated and segmented facsimile image data to reveal the raw facsimile image data, converting raw facsimile image data and transmitting the converted raw facsimile image data to a fax terminal.

2. The method of claim 1, wherein said step b. comprises the steps of:

f. initializing and synchronizing a radio link protocol when a traffic signal is allocated and a service option is responded to from the base station;

g. transmitting a call connection confirmation from the mobile terminal to the data terminal;

h. initializing the point-to-point protocol between the data terminal and the base station, driving the link control protocol to configure a serial link, and activating the internet control message protocol to allocate and IP address and negotiate a transport control protocol/internet protocol header compression; and i. driving the transport control protocol and the internet protocol using the data terminal and the base station.

3. The method of claim 1, wherein each said steps c. and d. comprise the steps of:

transmitting the stored modem commands including the modem dial command encapsulated by all the protocols to the base station using the application interface of the data terminal; and progressing with facsimile service following normal phases of ITU-T recommendation T.30 using the facsimile application software and the fax terminal when the data terminal receives a confirmation message from the modem.

4. The method of claim 1, wherein said step e. comprises the steps of:

terminating the application software by a modem hangup message when the fax transmission is complete;

sequentially deactivating the application interface, the transport control protocol, the internet control message protocol, the point-to-point protocol, the internet protocol, the link control protocol, and the radio link protocol; and releasing the facsimile call on a CDMA traffic channel.

* * * * *